United States Patent [19]

Laramore

[11] 4,123,213

[45] Oct. 31, 1978

[54] AUTOMATIC BAKERY PRODUCT DUSTING FLOUR RECYCLING SYSTEM

[76] Inventor: William D. Laramore, Rte. 1, Summerhill Rd., Thomasville, Ga. 31792

[21] Appl. No.: 802,056

[22] Filed: May 31, 1977

[51] Int. Cl.² .............................................. A21C 9/04
[52] U.S. Cl. ................................... 425/104; 425/90; 425/217; 209/234; 209/255; 209/257; 209/285
[58] Field of Search .................. 209/2, 234, 250, 236, 209/244, 357, 285, 295, 312, 318, 321, 30, 31, 255, 257, 245, 235; 425/90, 93, 104, 94, 101, 337, 217; 118/602, 603, 610, 24, 312; 99/494

[56] References Cited

U.S. PATENT DOCUMENTS

| | | | |
|---|---|---|---|
| 1,596,824 | 8/1926 | Fuller | 209/250 |
| 2,062,215 | 11/1936 | Dubus | 209/2 |
| 2,257,322 | 9/1941 | Barnard | 209/295 X |
| 2,586,223 | 2/1952 | Harmon | 209/2 |
| 2,690,493 | 9/1954 | Schaefer | 209/144 X |
| 2,963,994 | 12/1960 | Britcher | 425/104 X |
| 3,012,697 | 12/1961 | Rouse et al. | 209/236 X |

Primary Examiner—Frank W. Lutter
Assistant Examiner—Ralph J. Hill
Attorney, Agent, or Firm—B. P. Fishburne, Jr.

[57] ABSTRACT

For the purposes of saving flour and removing flour from the air for the safety of workers, large quantities of dusting flour used during the transfer of rolls from a standard dough dividing and rounding machine to a standard aging and panning machine is allowed to gravitate within an enclosure onto a screen covered flour chute which communicates at its lower end with a vacuum nozzle. The vacuum nozzle is connected by means of a hose with an overhead suction device on a flour holding tank having a flour sifting means at its lower end for delivering the dusting flour onto rolls while they are passing through a transfer chute between the two standard machines.

7 Claims, 5 Drawing Figures

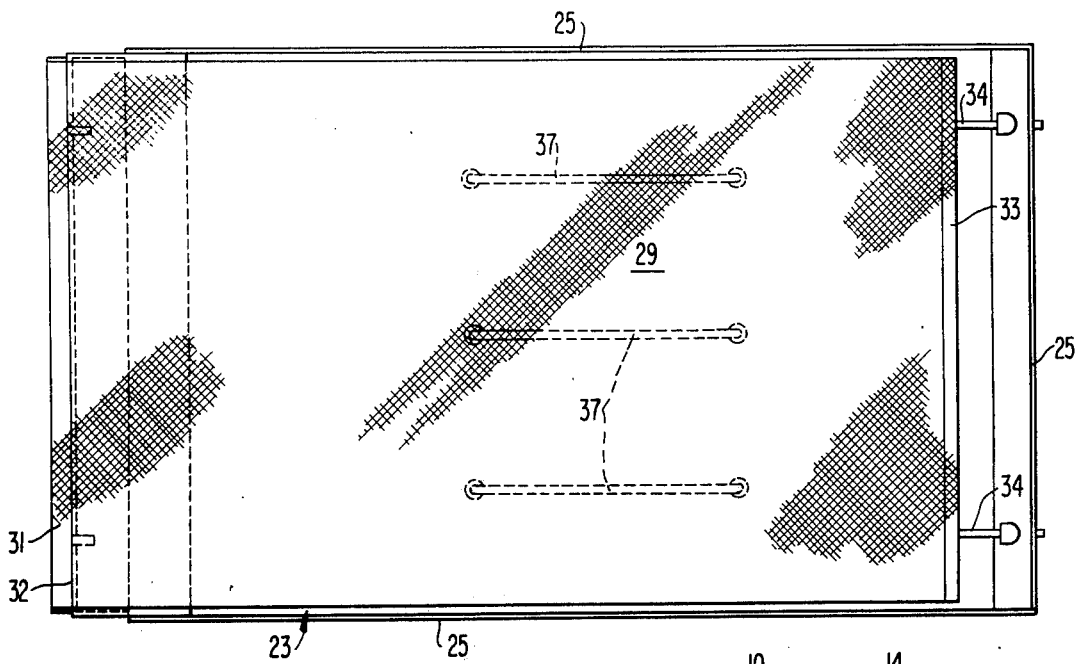
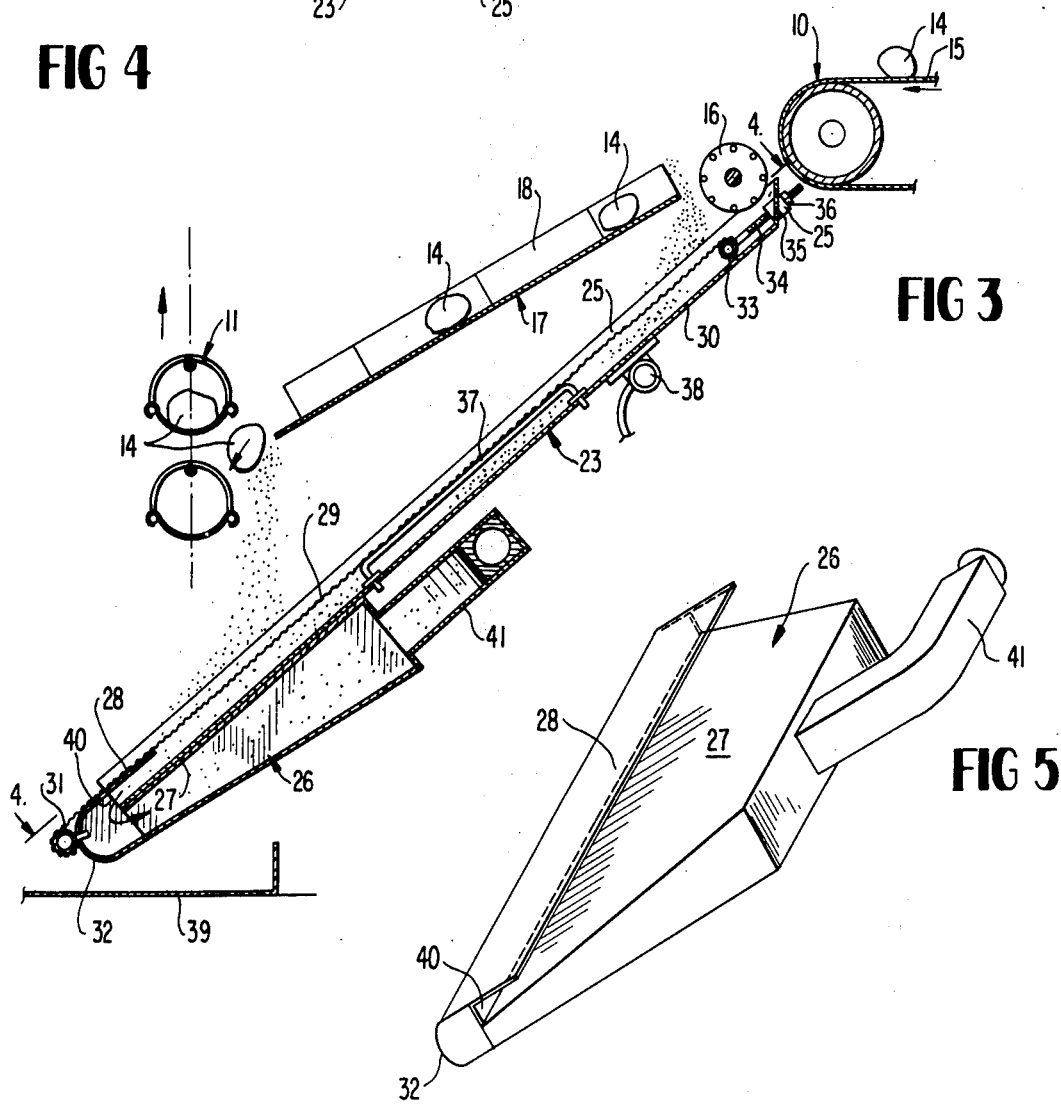

AUTOMATIC BAKERY PRODUCT DUSTING FLOUR RECYCLING SYSTEM

BACKGROUND OF THE INVENTION

The concept of a vacuum system to collect otherwise wasted flour and return it to a hopper is broadly known in prior U.S. Pat. Nos. 1,963,005 and 2,963,994. Flour duster-sifter means, broadly speaking, are also known in U.S. Pat. No. 2,633,242.

Despite these prior art teachings, a need exists for an efficient, economical and practical dusting flour recycling system adaptable to industry standard equipment for dividing and rounding bakery products and aging and delivering the products, such as rolls, to pans for baking.

Under present practice, at the point of transfer between the two standard machines where the raw dough balls are traversing an inclined zigzag chute, large amounts of dusting flour is sifted onto the dough balls to prevent them from sticking to surfaces of the transfer chute. The excess dusting flour is caught rather haphazardly in an open catch pan below the transfer chute. Occasionally, a dough piece will miss transferring and fall into the catch pan along with dough particles which leak from under the rounder bars of the standard equipment. Because of these factors, most of the recovered dusting flour is thrown away. Furthermore, the air surrounding the standard machinery is heavily charged with flour and is breathed in by workers which is hazardous to health and also creates unsanitary surroundings.

In light of the above, the objective of this invention is to satisfy the existing need in the art for a dusting flour recycling system which can be adapted at comparatively low cost to the industry standard machinery which presently lacks any such system. By doing so, the invention provides a means for recycling and using valuable flour which is ordinarily lost while greatly improving the quality of the air in the vicinity of the machine.

SUMMARY OF THE INVENTION

In accordance with the invention, an enclosure for dusting flour bridges the gap between the standard dough dividing and rounding machine and the standard aging and panning machine. The customary inclined zigzag raw dough ball transfer chute and squirrel cage transfer rotor are both located within the enclosure. The bottom of the enclosure is defined by an inclined dusting flour collection chute forming a key element of the invention and having a taut sifting screen extending thereover in spaced relation to the floor of the chute. A vibrator means is connected with the floor of the chute and a vacuum nozzle beneath the chute communicates with the lower flour discharge end of the chute. An overhead flour holding tank is equipped with a suction device which lifts dusting flour from the vacuum nozzle through a hose leading to the holding tank. The top of the tank carries an air relief bag and the bottom of the tank carries a flour hopper and associated sifter and slide plate to promote the delivery of dusting flour onto the raw dough balls during their traverse of the zigzag transfer chute. Excess flour from both ends of the transfer chute within the enclosure falls onto the flour chute and is returned through the suction system to the holding tank.

BRIEF DESCRIPTION OF THE DRAWINGS

FIG. 3 is an enlarged vertical section taken through the flour chute, vacuum nozzle and associated elements of the invention.

FIG. 4 is an elevational view of the flour chute and sifter screen taken on line 4—4 of FIG. 3.

FIG. 5 is a perspective view of the vacuum nozzle separated from the flour chute.

DETAILED DESCRIPTION

Figure 2:
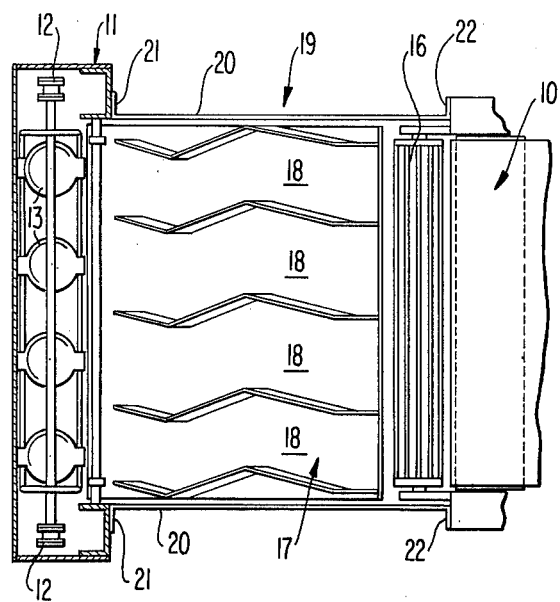
FIG. 2 is a horizontal section taken on line 2—2 of FIG. 1.

Referring to the drawings in detail, wherein like numerals designate like parts throughout, the numeral 10 designates the discharge end portion of an industry standard model "K" roll machine where dough is divided and formed into rounded balls for transference to another industry standard machine 11 known as a roll "Panomat" machine where the raw dough balls are aged to form a film thereon prior to sheeting through rollers and delivery into pans. The machine 11 embodies a moving flexible conveyor element 12 carrying a plurality of equidistantly spaced dough ball transport cups 13, as illustrated. When the raw dough balls 14 are transferred from the Model "K" machine 10 to the standard "Panomat" machine 11, FIG. 3, they pass from the discharge end of a horizontal conveyor means 15 of the machine 10 onto a rotating squirrel cage roller 16 which is also a standard part of the machine 10 and beyond this roller the raw dough balls pass onto an inclined dough transfer chute 17 having a plurality of zigzag channels 18, as best shown in FIG. 2. The transfer chute 17 is fixedly mounted and is also a conventional industry item.

During the raw dough ball transfer operation shown in FIG. 3, substantial quantities of dusting flour must be sifted onto the dough balls 14 to prevent them from sticking to the surfaces in the zigzag channels 18 of the transfer chute. The instant invention is for the specific purpose of delivering the dusting flour in a controlled manner from an overhead holding tank onto the dough balls 14 in the transfer zone and recovering and recycling the excess dusting flour for the purposes of economy and to purify the surrounding air.

Figure 1:
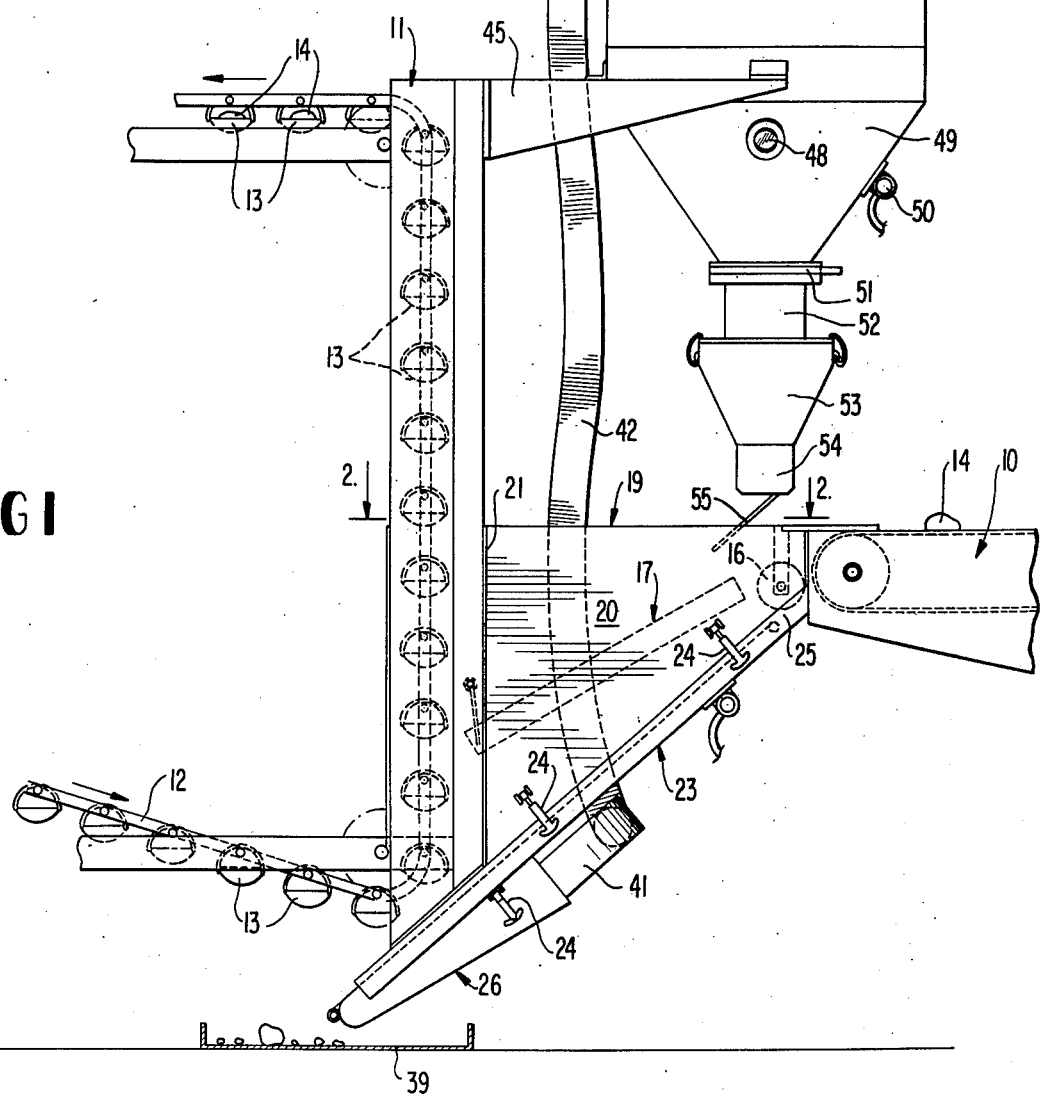
FIG. 1 is a side elevation of the invention.

More particularly, the invention comprises an enclosure 19 bridging the transfer zone between the two machines 10 and 11 and including a pair of spaced vertical side walls 20 suitably connected as at 21 and 22, FIG. 2, to the frames of the standard machines 10 and 11. The bottom of the enclosure 19 defined by the two side walls 20 is formed by a rather steeply inclined dusting flour catching and return chute 23 forming a key element of the invention. The top of the enclosure 19 is essentially open. The transfer chute 17, as shown in FIG. 1, is disposed substantially centrally within the enclosure 19 between the side walls 20.

The flour chute 23 is releasably coupled to the bottoms of the side walls 20 by quick release latches 24 of the type used on certain vehicle hoods and the like. The inclined chute 23 underlies the entire bottom of the enclosure 19 between its side walls 20 and extends beyond one end of the enclosure 19 which is adjacent the "Panomat" machine 11, thereby partially underlying the machine 11, FIG. 1.

The flour chute 23 has relatively shallow side flanges or walls 25 and is essentially open at its top and lower end. A vacuum nozzle 26 having the shape depicted in FIG. 5 underlies the lower end portion of the flour chute 23 with its top wall 27 in contact with the flat bottom of the chute as shown in FIG. 3. The vacuum nozzle 26 is releasably coupled in assembled relationship with the chute 23 by additional conventional hood latches 24, carried by the chute 23. The previously-described latches 24 are carried by the enclosure side walls 20.

At its forward end, the vacuum nozzle 26 has a somewhat elevated flange plate 28 overlying the floor of the chute 23 and serving as a support for one end of a taut sifter screen 29 which spans the chute 23 in spaced relation to the floor or bottom wall 30 of the chute. The forward or lower end of the sifter screen 29 is attached to a transverse pipe element 31 for rigidity and to allow the sifter screen to be stretched taut. The pipe element 31 is fixedly anchored to the rounded leading end wall 32 of vacuum nozzle 26 which is spaced somewhat in advance of the lower open end of the chute 23, FIG. 3. The opposite end of sifter screen 29 is similarly attached to a transversely extending pipe section 33 connected with screw-threaded rods 34 passing through bearing elements 35 on the upper end wall 25 of the chute 23. Tightening nuts 36 on the threaded rods 34 are employed to stretch the sifter screen 29 to a taut condition where it will remain in parallel spaced relation to the bottom wall 30 of the flour chute. Spacer rods 37 are also provided at the central portion of the chute and sifter screen to prevent the taut screen from sagging.

Near and below its upper end, the bottom wall 30 of flour chute 23 has a conventional high frequency vibrator unit 38 connected therewith to assure that the dusting flour falling onto the chute will gravitate to the lower end thereof and enter the vacuum nozzle 26. A catch pan 39 for raw dough pieces which may fall on the sifter screen 29 or for the occasional dough ball 14 which is lost in the transfer operation is arranged below the bottom of the chute 23 so that such dough can be recycled and is not lost.

As best shown in FIG. 5, the vacuum nozzle 26 is wedge-shaped, tapering toward its rounded forward end wall 32 carrying the elevated flange plate 28. At its forward end, the vacuum nozzle spans the full width of the chute 23 and the lower open end of the chute 30 registers with the transverse inlet slot 40 of the vacuum nozzle which also extends for the full width of the nozzle. Therefore, it is assured that all dusting flour passing downwardly on the chute 23 will enter the nozzle 26 and no flour escapes to the air or is otherwise lost. Except for the inlet slot 40, the vacuum nozzle 26 is completely closed at its top, bottom and side walls.

An elbow extension 41 carries off flour from the rear end of the inclined nozzle 26 and delivers it to a vacuum hose 42 coupled with the elbow extension 41. The hose 42 extends upwardly and is coupled with a motor driven vacuum pump or blower 43 mounted on one side of an upright cylindrical flour holding tank 44 suitably bracketed at 45 to the machine 11. The vacuum pump 43 delivers the recycled flour to the upper portion of the tank preferably tangentially of its side wall. A fabric air release bag 46 on the top of the tank allows the escape of air therefrom while retaining the flour. On the opposite side of the tank 44, a flour filled pipe 47 delivers flour to the dusting system from the conventional plant supply, not shown.

Sight glasses 48 are provided near the top of holding tank 44 and on a hopper extension 49 at the bottom of the holding tank. A conventional vibrator unit 50 is secured to the hopper extension 49. The hopper extension has an iris-type flour outlet valve 51 at its bottom, and below this valve a fabric sock 52 connects the hopper extension 49 with a hopper 53, delivering dusting flour to a flour sifter 54 having an inclined flour slide plate 55 at its bottom for directing the dusting flour onto the transfer chute 17 as the raw dough balls 14 are traversing the zigzag channels 18 of the transfer chute.

It should now be clearly apparent that the invention provides a completely automatic economical and practical recycling system for the large quantities of dusting flour which are continually required to be applied to the raw dough products during their transfer from the machine 10 to the machine 11 via the transfer chute 17. When the conveyor belt of the machine 10 is activated, the flour sifter 54 begins delivering dusting flour onto the chute 17. This flour prevents the raw dough balls from sticking to the transfer chute 17. The excess flour plus any dough balls or dough particles falling from either end of the chute 17 fall onto the sifter screen 29, the flour entering the chute 23 and the dough particles rolling down the screen into the catch pan 39. The flour in the chute 23, with the aid of vibrator 38, passes from the lower end of the chute into the vacuum nozzle 26 in a reverse flow path as shown by the arrow in FIG. 3. From the nozzle 26, the dusting flour is delivered through the hose 42 and pump 43 to the top of the holding tank 44 for reuse, as described.

The system saves great quantities of flour and dough normally lost in the prior art and also removes much flour from the air, greatly improving the environment for workers around the machine.

The advantages of the invention should now be fully apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In bakery product manufacturing apparatus of the type in which bakery products are transferred from a dough dividing and rounding machine to a dough ball aging and panning machine by means of an inclined transfer chute disposed between the two machines, and said apparatus further including a dusting flour holding tank having a lower end flour sifting means above said transfer chute, the improvement comprising a pair of enclosure side walls bridging the transfer zone between said two machines and being disposed on opposite sides of said transfer chute, said enclosure side walls having inclined lower edges below the transfer chute, a correspondingly inclined dusting flour chute immediately below the enclosure side walls and substantially abutting said inclined lower edges, said dusting flour chute extending somewhat above and below the upper and lower ends of said transfer chute, a sifting screen substantially covering the top of the dusting flour chute in spaced relation to the bottom wall thereof, the dusting flour chute being open at its lower end, a vacuum nozzle mounted immediately below the bottom wall of the dusting flour chute and having a lower end intake disposed in direct communication with the lower open end of the dusting flour chute, and excess dusting flour recycling means interconnecting said vacuum nozzle with said dusting flour holding tank.

2. In bakery product manufacturing apparatus as defined in claim 1, and said lower end intake of the vacuum nozzle comprising an arcuate wall extension on the lower end of the vacuum nozzle disposed in communicating relationship with the open lower end of said dusting flour chute and providing a reverse flow passage for dusting flour passing from the dusting flour chute to said vacuum nozzle.

3. In bakery product manufacturing apparatus as defined in claim 2, and an upper flange plate carried by the top of said arcuate wall extension and overlying the bottom wall of said dusting flour chute near the lower end portion thereof and defining with such bottom wall a dusting flour entrance slot for said reverse flow passage.

4. In bakery product manufacturing apparatus as defined in claim 3, and said sifting screen resting on said upper flange plate, a first holding bar for the lower end of said sifting screen secured to said arcuate wall extension, a second holding bar for the upper end of said sifting screen near the upper end of the dusting flour chute, and screw-threaded means on the dusting flour chute coupled with said second holding bar and operable to stretch said sifting screen to a taut condition.

5. In bakery product manufacturing apparatus as defined in claim 4, and spacer rod means on the dusting flour chute near the longitudinal center thereof and underlying the center region of the sifting screen to prevent sagging of the screen toward the bottom wall of the dusting flour chute.

6. In bakery product manufacturing apparatus as defined in claim 5, and a vibrator unit connected with the bottom wall of the dusting flour chute to assist the passage of flour downwardly thereon toward said vacuum nozzle.

7. In bakery product manufacturing apparatus as defined in claim 4, and quick release fasteners coupling the dusting flour chute to said inclined lower edges of the enclosure side walls and coupling said vacuum nozzle releasably to the bottom of the dusting floor chute.

* * * * *